United States Patent
Kim et al.

[11] Patent Number: 5,867,803
[45] Date of Patent: Feb. 2, 1999

[54] TRACTION CONTROL APPARATUS

[75] Inventors: Keon Kim, Seoul; Jun-Nam Oh, Namyangju-shi; Pyung-Seok Park, Namyangju-shi; Hwi-Seop Kim, Namyangju-shi; Pyung-Sang Lee, Seoul; Je-Hyung Lee, Hanam-shi, all of Rep. of Korea

[73] Assignee: Mando Machinery Corp., Kyunggi-do, Rep. of Korea

[21] Appl. No.: 864,531

[22] Filed: May 28, 1997

[30] Foreign Application Priority Data

May 28, 1996 [KR] Rep. of Korea ............... 1996 18262
Aug. 29, 1996 [KR] Rep. of Korea ............... 1996 36375

[51] Int. Cl.$^6$ ............... G06G 7/76; G06F 7/70
[52] U.S. Cl. ............... 701/85; 701/90; 701/82; 701/92; 180/197; 123/333
[58] Field of Search ............... 701/70, 73, 74, 701/82, 84, 85, 90, 92; 180/197, 170; 303/140, 196; 477/185, 186; 123/333, 336, 396

[56] References Cited

U.S. PATENT DOCUMENTS

| 5,025,882 | 6/1991 | Ghoneim et al. | 701/70 |
| 5,096,016 | 3/1992 | Tada et al. | 701/70 |
| 5,329,453 | 7/1994 | Tsuyama et al. | 701/83 |
| 5,365,443 | 11/1994 | Tsuyama et al. | 701/71 |
| 5,418,726 | 5/1995 | Yagi | 701/85 |
| 5,469,359 | 11/1995 | Tsuyama et al. | 701/90 |
| 5,575,255 | 11/1996 | Abe et al. | 701/85 |
| 5,765,657 | 6/1998 | Fukumura et al. | 701/85 |

*Primary Examiner*—Jacques H. Louis-Jacques
*Attorney, Agent, or Firm*—Anderson, Kill & Olick, P.C.

[57] ABSTRACT

A traction control apparatus is provided with a control factor calculation section for determining current slip values of the driving wheels, differential values of the wheel slips, a value of the vehicle speed, values of longitudinal acceleration and jerk resulting therefrom and values of centripetal acceleration and jerk resulting therefrom, a running condition and road surface decision section for determining a desired engine torque value and gain coefficients for controlling the engine torque values, a degree of unsafety allowable, gain coefficients for controlling the degree of unsafety by using the values determined by the control factor calculation section and the values outputted from the PD controlling section, an acceleration performance enhancing section for determining a first desired opening angle of a throttle valve by using the desired engine torque, the gain coefficients for controlling the engine torque and the values determined by the control factor calculation section, a driving safety securing section for determining a second desired opening angle of the throttle valve by using the degree of unsafety allowable, the gain coefficients for controlling the degree of unsafety, the values determined by the control factor calculation section a throttle motor controlling section for operating the throttle motor connected to the throttle valve depending upon the smaller one of the first and the second desired opening angles of the throttle valve.

6 Claims, 11 Drawing Sheets

TRACTION CONTROL APPARATUS

FIELD OF THE INVENTION

The present invention relates to a traction control apparatus; and more particularly, to a traction control apparatus capable of generating more accurate responses to wheel slips by incorporating therein calculation steps reflecting the road conditions and eliminating a need for using values with having incompatible physical dimensions from each other.

DESCRIPTION OF THE PRIOR ART

A traction control apparatus equipped with a secondary throttle valve is conventionally incorporated in a vehicle for two reasons. One is to control the engine torque to prevent the driving wheels from slipping when the vehicle suddenly starts from a stopped state or suddenly accelerates from a low-speed running state. The other is to ensure the running safety of a vehicle in a fast curvilinear motion by decreasing the vehicle speed through the reduction of engine torque.

Figure 1:
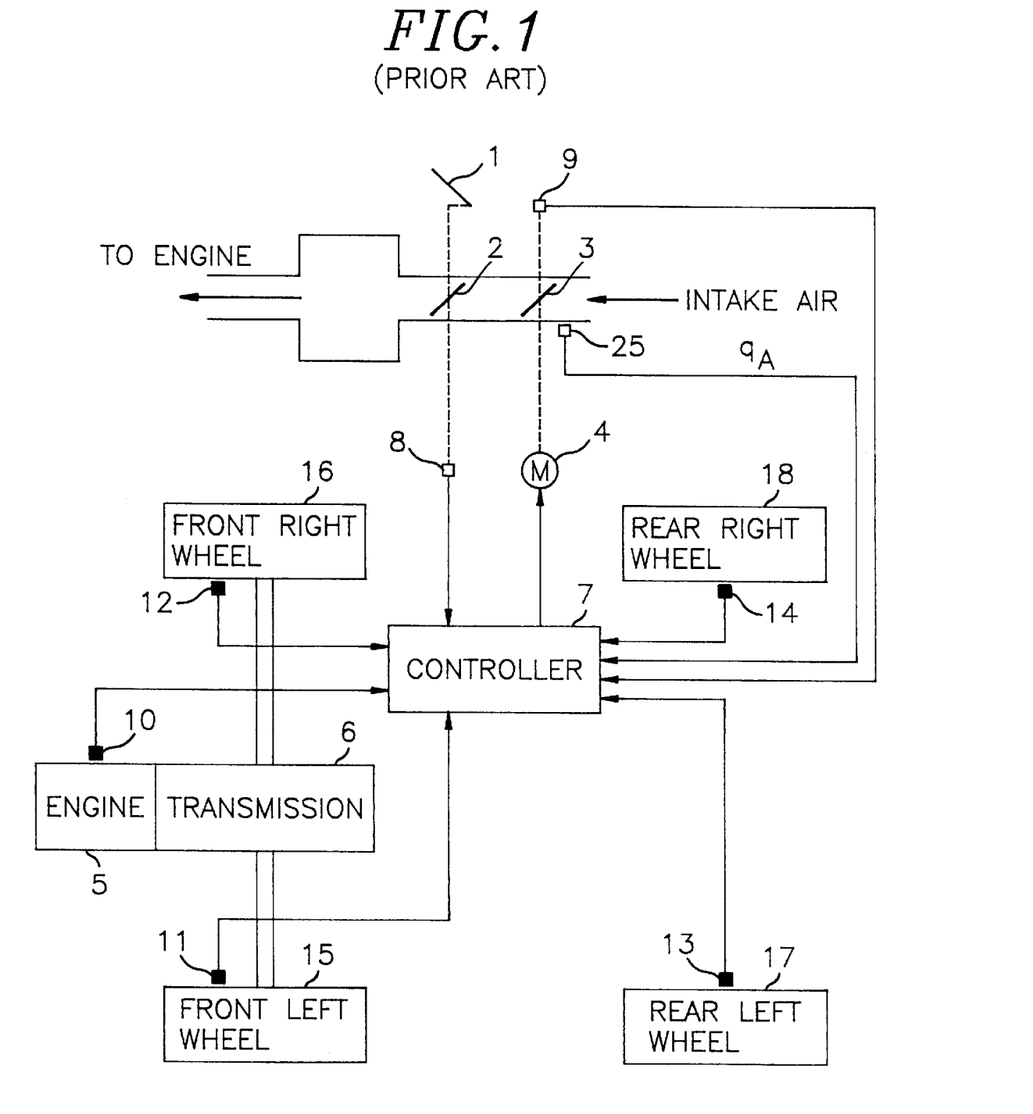
FIG. 1 shows a schematic diagram of a prior art traction control apparatus.

FIG. 1 illustrates a schematic block diagram of one of the prior art traction control apparatuses incorporated in a front wheel drive type vehicle. Reference numerals 15 and 16 represent front wheels. Reference numerals 17 and 18 are rear wheels, and reference numerals 11, 12, 13 and 14 are wheel speed sensors which are installed on each of the wheels, respectively. In the apparatus, an accelerating pedal 1 is connected to a main throttle valve 2; and a throttle motor 4 is connected to a secondary throttle valve 3. Reference numeral 5 and 6 indicate an engine and a transmission for delivering the power generated by the engine to the front wheels 15 and 16, respectively. Opening angles of the main and the secondary throttle valves 2 and 3 are detected by opening angle sensors 8 and 9, respectively. The amount of intake air $q_A$ is measured by an air flow sensor 25. The rotating speed of the engine 5 is detected by a rotating speed sensor 10. The rotating speeds of the wheels are detected by the wheel speed sensors 11, 12, 13 and 14. The values detected by the above mentioned sensors are inputted to an electronic controller 7 which, in turn, calculates and generates outputs for driving the throttle motor 4 using the values inputted thereto.

In a front wheel drive type vehicle using the prior art traction control apparatus, a running speed V of the vehicle is calculated using the following formula:

$$V = \frac{(V_{RR} + V_{RL})}{2}, \qquad \text{(i)}$$

wherein $V_{RL}$ and $V_{RR}$ representing a rear left wheel speed and a rear right wheel speed, respectively, are detected by the respective wheel speed sensors 13 and 14.

Wheel slips $S_L$ and $S_R$ of the left and the right front wheels 15 and 16 are calculated using the following formulas:

$$S_L = V_{FL} - V \qquad \text{(ii)}$$

$$S_R = V_{FR} - V, \qquad \text{(iii)}$$

wherein $V_{FL}$ and $V_{FR}$, representing a front left wheel speed and a front right wheel speed, respectively, are detected by the respective wheel speed sensors 11 and 12.

The front wheels 15 and 16 slip when engine torque is greater than friction between the front wheels 15 and 16 and ground. In such a situation, the amount of intake air $q_A$ is higher than necessary as a result of the main throttle valve 2 being opened at an angle $\theta_p$ greater than an adequate value. It should be noticed that an opening angle $\theta_p$ of 0 is defined as a fully closed state of the main throttle valve 2.

The electronic controller 7 of the prior art traction control apparatus closes the secondary throttle valve 3 by operating the throttle motor 4 to thereby reduce the amount of intake air $q_A$ and hence the engine torque and the vehicle speed.

When the vehicle runs at a constant speed, a centripetal acceleration aY of the vehicle is calculated using the following formula:

$$aY = \frac{(V_{RL} + V_{RR})}{2} * \frac{(V_{RL} - V_{RR})}{TR}, \qquad \text{(iv)}$$

wherein a tread TR represents the distance between the rear right wheel 18 and the rear left wheel 17. The electronic controller 7 compares the calculated centripetal acceleration aY with a predetermined centripetal acceleration.

If the calculated centripetal acceleration aY is greater than the predetermined centripetal acceleration and the amount of intake air $q_A$ is higher than necessary, the electronic controller 7 closes the secondary throttle valve 3 by operating the throttle motor 4 to thereby reduce the amount of intake air $q_A$ and hence the engine torque and the vehicle speed.

Figure 2:
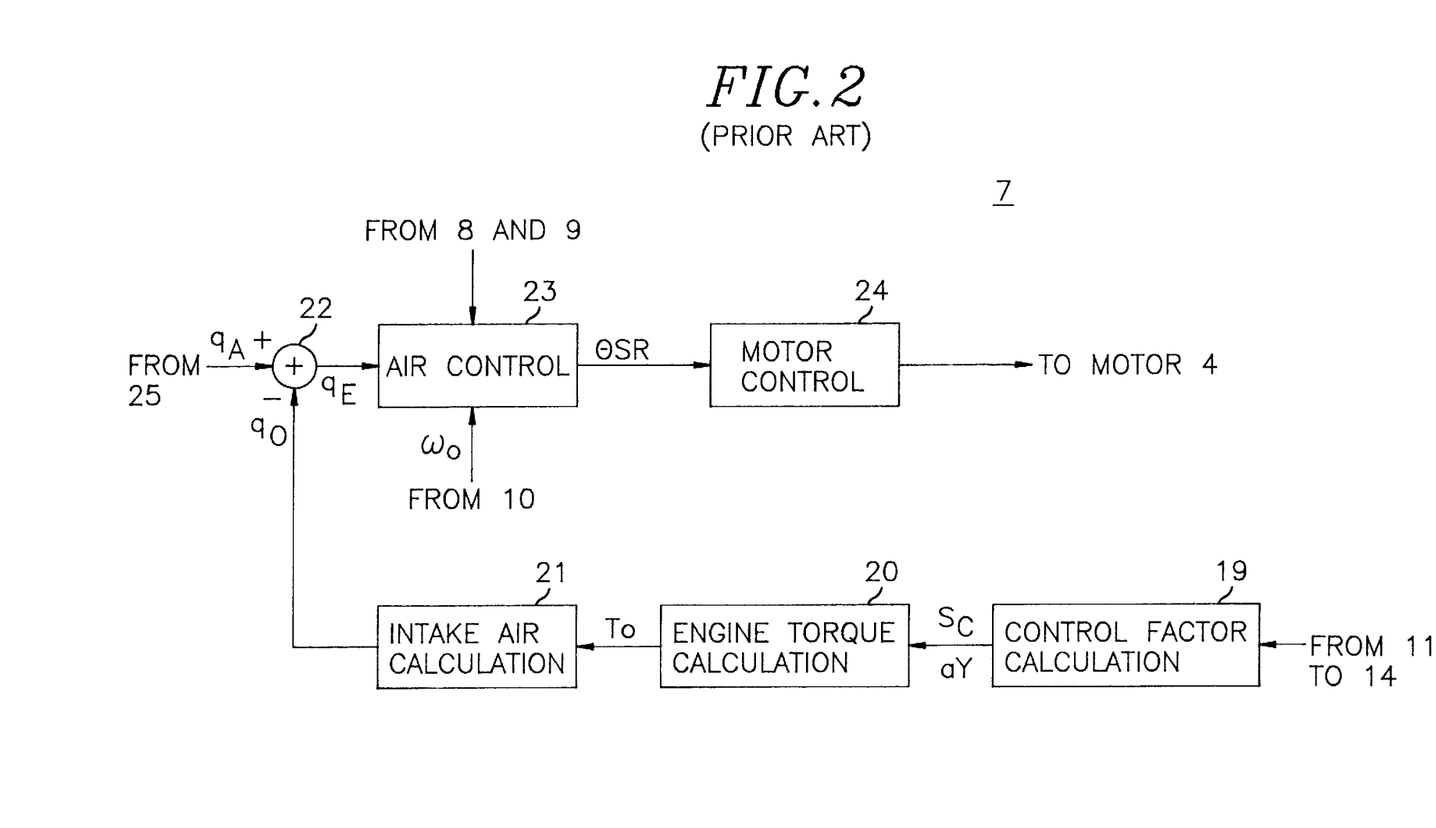
FIG. 2 represents a schematic block diagram of an electronic controller employed in the prior art traction control apparatus.

FIG. 2 presents a schematic block diagram showing how the electronic controller 7 controls the amount of intake air $q_A$ by controlling the throttle motor 4. A control factor calculation section 19 calculates a wheel slip $S_C$ and the centripetal acceleration aY using the rotating speeds of the wheels detected by the sensors 11–14. Using the calculated wheel slip $S_C$ and the centripetal acceleration aY, an engine torque calculating section 20 therein calculates an engine torque required $T_O$; and an intake air amount calculating section 21 calculates a just amount of intake air $q_O$.

When the just amount $q_O$ is inputted to a subtractor 22, the subtractor 22 calculates a difference $q_E$ by subtracting the just amount $q_O$ from the amount of intake air $q_A$ determined by the airflow sensor 25.

The difference $q_E$ of intake air difference is then inputted to an air controlling section 23. The controlling section 23, using a current throttle valve angle, a current secondary throttle valve angle and a rotating speed $\omega_O$ of the engine 5 from sensors 8, 9, 10, respectively, outputs a command signal to open or close the secondary throttle valve 3 through the throttle motor 4 at a desired opening angle $\theta_{SR}$ to thereby compensate the difference $q_E$.

There are a number of shortcomings associated with the above described traction control apparatus, one of them being the accuracy. For example, in calculating the desired opening angle $\theta_{SR}$, a value is converted to into a value whose physical dimension is incompatible with the value, e.g., the centripetal acceleration aY having a physical dimension of m/sec² to a wheel slip value having a physical dimension of m/sec, and this may affect the overall accuracy of the desired opening angle calculated.

Another shortcoming in using the accelerating performance of the vehicle in calculating and generating the signal to open or close the secondary throttle valve 3 through the throttle motor 4 is that, only the rotating speed of the engine and opening angles of the main throttle valve and the secondary throttle valve, are taken into consideration, excluding the road conditions in calculating the signal, and this may affect the running safety of the vehicle.

SUMMARY OF THE INVENTION

It is, therefore, a primary object of the present invention is to provide a traction control apparatus which generates more accurate responses to wheel slips by incorporating therein calculation steps reflecting the road conditions and eliminating a need for using values having incompatible different physical dimensions from each other.

In accordance with one aspect of the present invention, there is provided a traction control apparatus for use with a vehicle, said apparatus comprising:

a control factor calculation section for calculation current slip values of driving wheels, differential values of the wheel slip, a value of a car speed, a value of longitudinal acceleration of the vehicle, a value of longitudinal jerk of the car, a current value of centripetal acceleration of the vehicle and a value of centripetal jerk of the vehicle by using wheel speed values detected by driving wheel speed sensors and driven wheel speed sensors;

a running condition and road surface decision section for determining a desired wheel slip value, a proportional gain coefficient for controlling the wheel slip, a differential gain coefficient for controlling the wheel slip, a desired value of centripetal acceleration, a proportional gain coefficient for controlling the centripetal acceleration and a differential gain coefficient for controlling the centripetal acceleration by using the values determined by said control factor calculation section;

an acceleration performance enhancing section for determining a first desired opening angle of a secondary throttle valve by using the desired wheel slip value, the proportional gain coefficient for controlling the wheel slip and the differential gain coefficient for controlling the wheel slip and the values determined by the control factor calculation section;

a driving safety securing section for determining a second desired opening angle of the secondary throttle valve by using the desired value of centripetal acceleration, the proportional gain coefficient for controlling the centripetal acceleration and the differential gain coefficient for controlling the centripetal acceleration and the values determined by the control factor calculation section; and a secondary throttle motor controlling section for operating a secondary throttle motor connected to the secondary throttle valve depending upon the smaller one of the first and the second desired opening angles of the secondary throttle valve.

BRIEF DESCRIPTION OF THE DRAWINGS

The above and other objects and features of the present invention will become apparent from the following description of the preferred embodiments when taken in conjunction with the accompanying drawings, in which.

DETAILED DESCRIPTION OF THE PREFERRED EMBODIMENT

Hereinafter, a traction control apparatus in accordance with the first embodiment of the present invention is described in detail with reference to FIGS. 3 to 6. It should be noted that although the main aspects of the first embodiment are shown in FIGS. 3 to 6, FIG. 1 will be from time to time referenced in describing the traction control apparatus. Furthermore, same reference numerals will be used to represent the same components in FIGS. 1 and 3 to 6.

Figure 3:
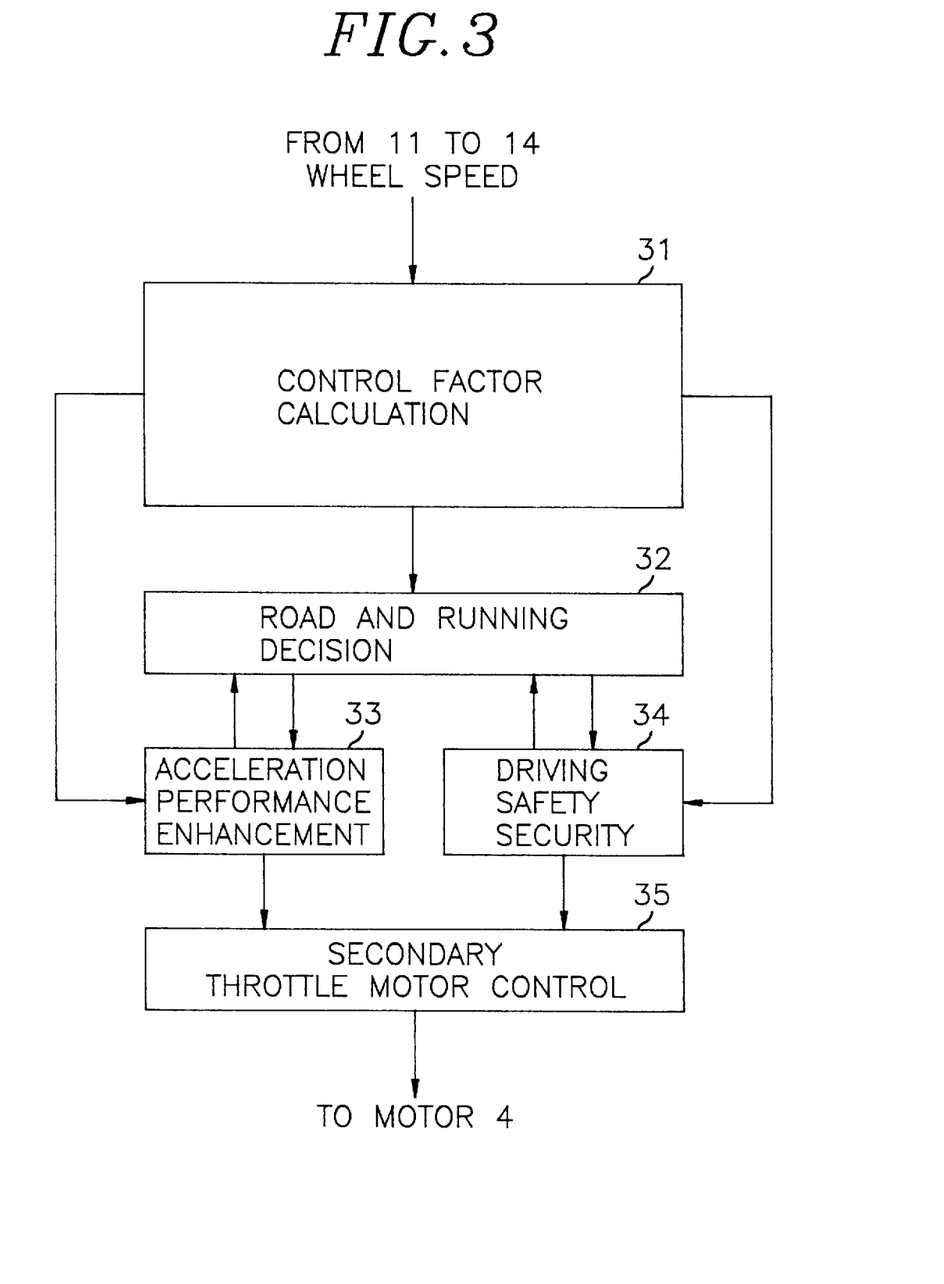
FIG. 3 illustrates a schematic block diagram of a traction control apparatus in accordance with a first embodiment of the present invention.

FIG. 3 is a schematic block diagram of the traction control apparatus in accordance with the first embodiment of the present invention. The traction control apparatus is provided with a control factor calculation section 31, a running condition and road surface decision section 32, an acceleration performance enhancing section 33, a driving safety securing section 34 and a secondary throttle motor controlling section 35.

In the traction control apparatus in accordance with the first embodiment of the present invention, rotating speeds of the wheels are inputted to the control factor calculation section 31, which calculates and outputs wheel slips $S_C$ of the wheels, first differential values of the wheel slips, a value of the vehicle speed V, a value of longitudinal acceleration of the vehicle $aX_C$, a first differential of the longitudinal acceleration, i.e., longitudinal jerk, of the vehicle, a current value of centripetal acceleration $aY_C$ of the vehicle and a value of first differential of the centripetal acceleration, i.e., centripetal jerk.

The running condition and road surface decision section 32 decides the running condition according to the outputs from the control factor calculation section 31 and generates outputs indicative of the road conditions.

The acceleration performance enhancing section 33 controls the engine torque to prevent the wheels from slipping on using the outputs from both the control factor calculation section 31 and the running condition and road surface decision section 32. The driving safety securing section 34 ensures the running safety by controlling the centrifugal force of the vehicle. The secondary throttle motor controlling section 35 allows the throttle motor 4 to control the opening angle of the secondary throttle valve 3 as shown in FIG. 1 by comparing the outputs from the acceleration performance enhancing section 33 and the outputs from the driving safety securing section 34.

Figure 4:
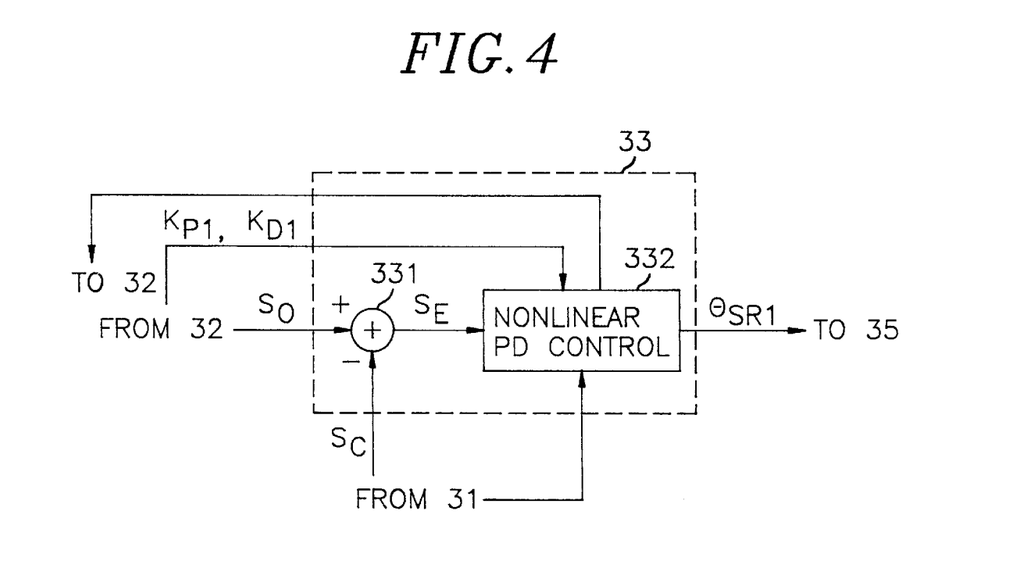
FIG. 4 depicts a schematic block diagram of an acceleration performance enhancing section in the first embodiment.

FIG. 4 is a schematic block diagram of the acceleration performance enhancing section 33 including a subtractor 331 and a nonlinear PD(proportional derivative) controlling section 332.

Figure 5:
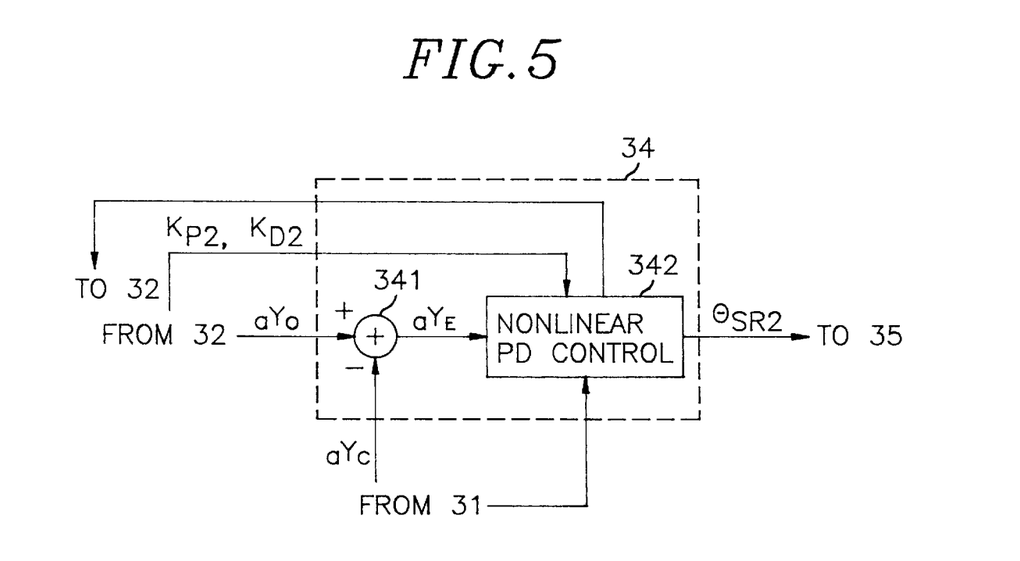
FIG. 5 offers a schematic block diagram of a driving safety securing section in the first embodiment.

FIG. 5 is a schematic block diagram of the driving safety securing section provided with a subtractor 341 and a nonlinear PD controlling section 342.

Figure 6:
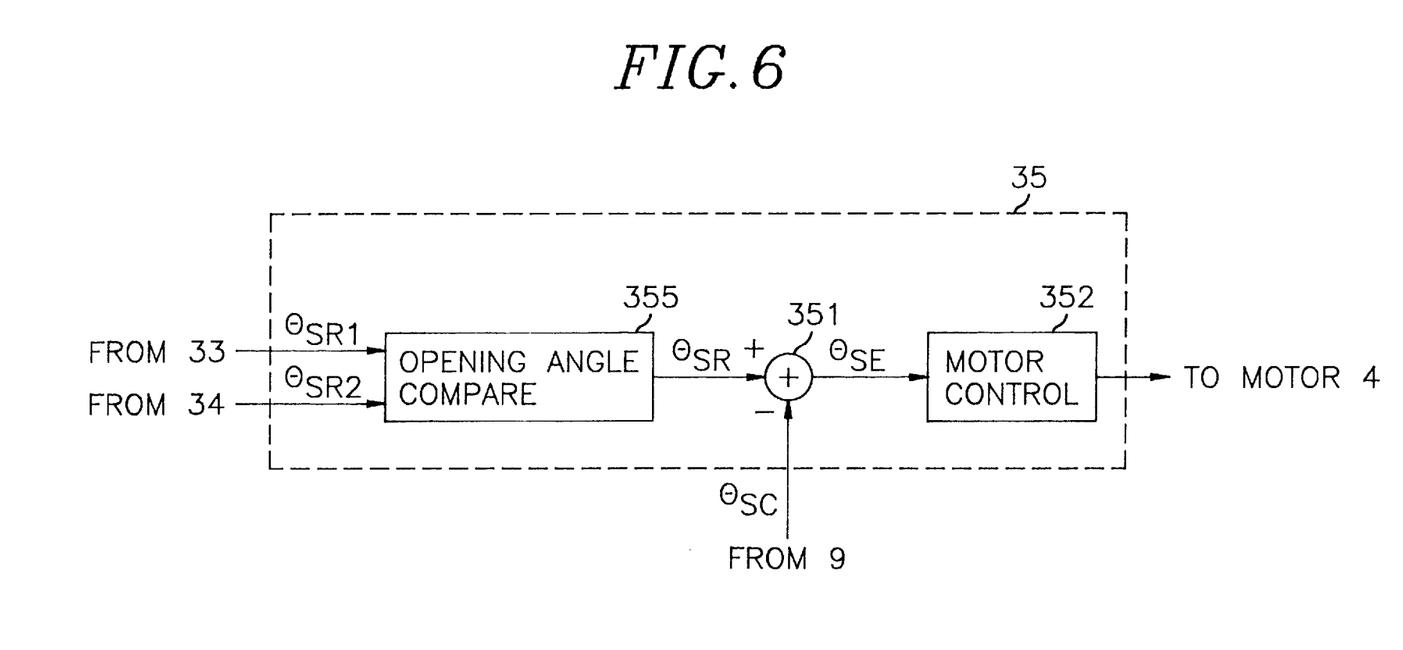
FIG. 6 is a schematic block diagram how a secondary throttle valve in the first embodiment is controlled.

FIG. 6 is a schematic block diagram showing how the secondary throttle motor is controlled. The secondary throttle motor controlling section 35 is provided with an opening angle comparing section 355, a subtractor 351 and a PID motor controlling section 352.

As stated earlier, in the first embodiment of the present invention, rotating speeds of the wheels 15–18 are inputted to the control factor calculation section 31, which, in turn, calculates and outputs the current slip values of the wheels, differential values of the wheel slips, the value of the vehicle speed, the value of longitudinal acceleration of the vehicle, the longitudinal jerk of the vehicle body, the current value of centripetal acceleration of the vehicle and the value of centripetal jerk of the vehicle.

The running condition and road surface decision section 32 calculates a desired wheel slip value $S_O$, a proportional gain coefficient $K_{P1}$ and a differential gain coefficient $K_{D1}$ using the outputs from the control factor calculation section 31 and from the nonlinear PD controlling section 332; and outputs $S_O$ to the subtractor 331, and $K_{P1}$ and $K_{D1}$ to the nonlinear PD controlling section 332.

The acceleration performance enhancing section 33 calculates, using the subtractor 331, an error wheel slip value $S_E$ by subtracting the current wheel slip value $S_C$ which is one of the outputs generated by the control factor calculation section 31 from the desired wheel slip value $S_O$ which is one of the outputs generated by the running condition and road surface decision section 32.

The nonlinear PD controlling section 332 compensates the calculated error wheel slip value $S_E$ using the proportional gain coefficient $K_{P1}$ and the differential gain coefficient $K_{D1}$ outputted from the running condition and road surface decision section 32; calculates a desired value of the opening angle $\theta_{SR1}$ within the maximum and the minimum set obtained using the outputs generated by the control factor calculation section 31; and generates outputs to be utilized to calculate the desired wheel slip value $S_O$, the proportional gain coefficient $K_{P1}$ and the differential gain coefficient $K_{D1}$ at the running condition and road surface decision section 32.

On the other hand, the running condition and road surface decision section 32 calculates the vehicle body centripetal acceleration $aY_O$, the proportional gain coefficient $K_{P2}$ and the differential gain coefficient $K_{D2}$ using the outputs from the control factor calculation section 31 and from the nonlinear PD controlling section 342; and outputs $S_O$ to the subtractor 341 and $K_{P2}$ and $K_{D2}$ to the nonlinear PD controlling section 342.

The driving safety securing section 34 calculates, using the subtractor 341, an error in centripetal acceleration $aY_E$ by subtracting the current value of centripetal acceleration aYc outputted from the control factor calculation section 31 from the desired value of centripetal acceleration $aY_O$ outputted by the running condition and road surface decision section 32. The nonlinear PD controlling section 342 compensates the error in centripetal acceleration $aY_E$ by using the PD controlling method based on the proportional gain coefficient $K_{P2}$ and the differential gain coefficient $K_{D2}$ outputted from the running condition and road surface decision section 32; calculates a desired opening angle $\theta_{SR2}$ within the maximum and the minimum set obtained using the outputs from the control factor calculation section 31; and generates outputs to be utilized to calculate the desired centripetal acceleration $aY_O$, the proportional gain coefficient $K_{P2}$ and the differential gain coefficient $K_{D2}$ at the running condition and road surface decision section 32.

The calculated desired opening angle $\theta_{SR1}$ outputted from the nonlinear PD controller 332 of the acceleration performance enhancing section 33 and the desired opening angle $\theta^{SR2}$ outputted from the nonlinear PD controlling section 342 of the driving safety securing section 34 are inputted to the opening angle comparing section 355 of the secondary throttle motor controlling section 35. The smaller angle being the desired opening angle $\theta_{SR}$ is inputted to the subtractor 351. The subtractor 351 calculates the error in the opening angle $\theta_{SE}$ by subtracting the current value of the opening angle $\theta_{SC}$ from the calculated desired opening angle $\theta_{SR}$. Using the error in the opening angle $\theta_{SE}$ calculated, the PID(proportional, integral and derivative) motor controlling section 352 controls the throttle motor 4 by using the PID controlling method. Herein, zero degree of opening angle is defined as a fully closed state.

As mentioned above, in the first embodiment of the present invention, there is no need to convert the centripetal acceleration value to the wheel slip value because the electronic controller calculates and controls the running safety and the accelerating performance separately. Furthermore, the electronic controller, as well as improving the running safety of the vehicle by restraining the excessive increase of the centrifugal force, improves the running safety by responding to the running condition by incorporating therein the nonlinear PD controlling section which determines the proportional gain coefficient and the differential gain coefficient based on the running conditions.

Hereinafter, a traction control apparatus in accordance with the second embodiment of the present invention is described in detail by using FIG. 7 to 12.

Figure 7:
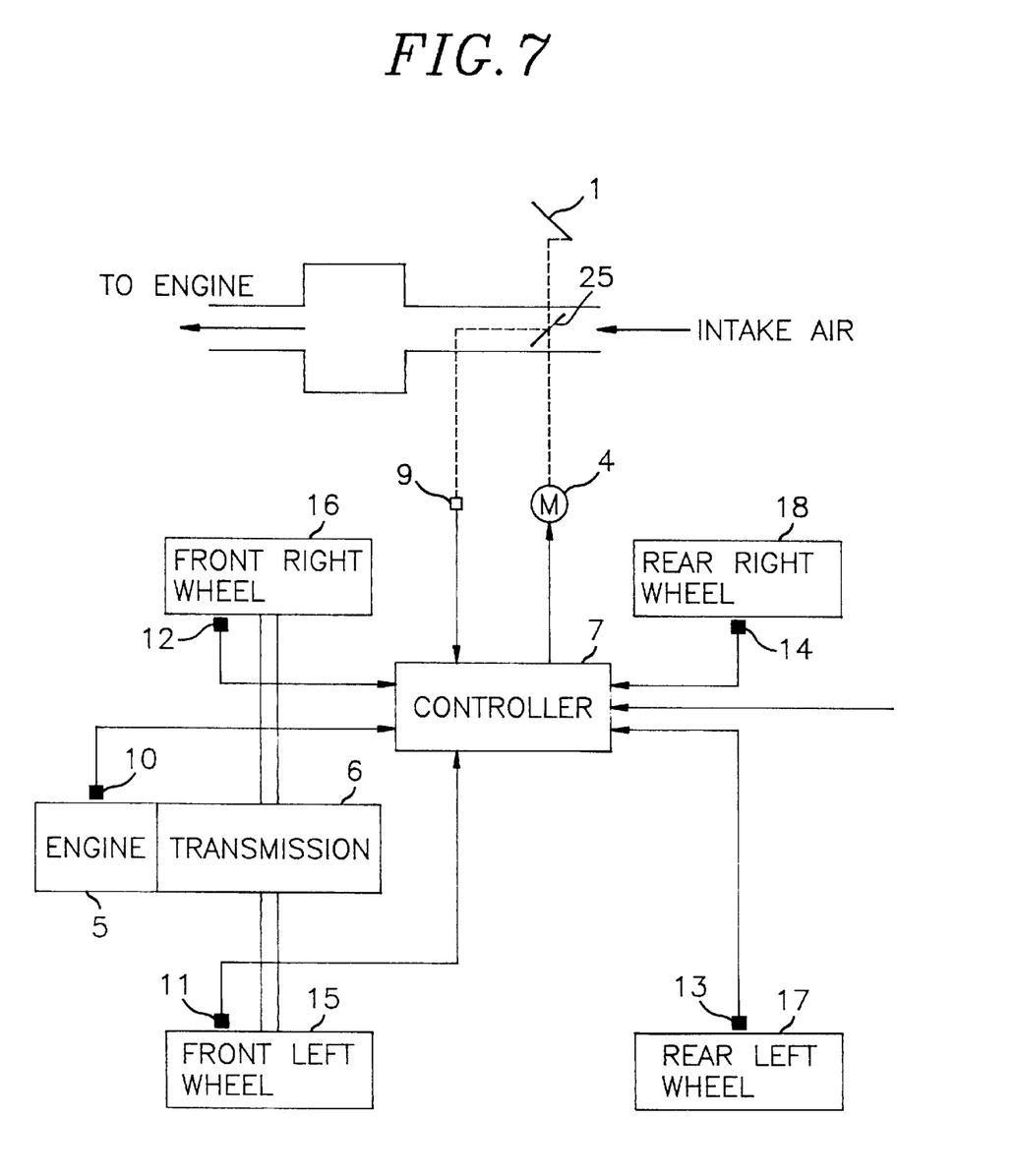
FIG. 7 presents a schematic block diagram of the traction control apparatus in accordance with a second embodiment of the present invention.
Figure 8:
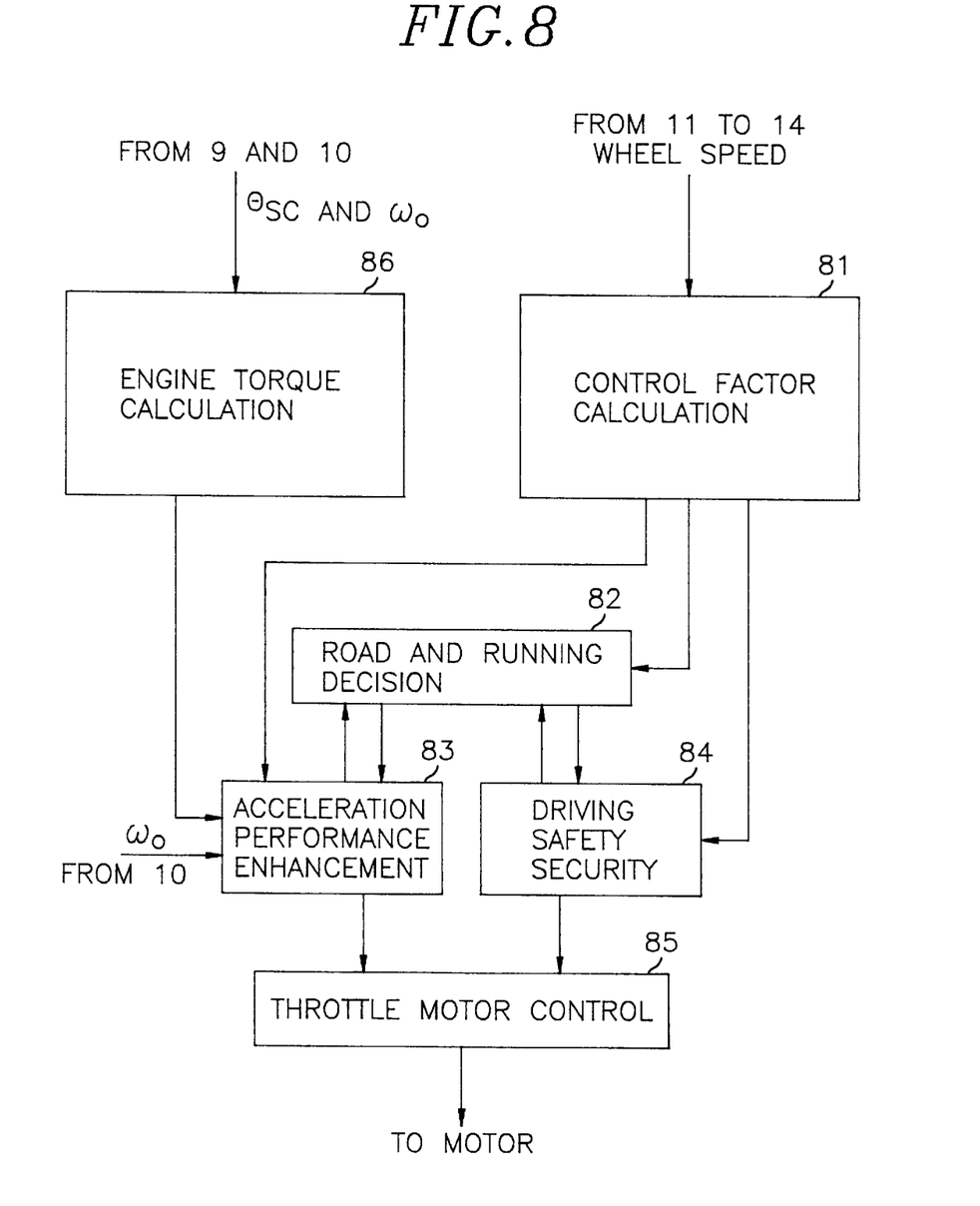
FIG. 8 provides a circuit diagram of the second embodiment.

FIG. 7 is a schematic block diagram of the traction control apparatus in accordance with the second embodiment of the present invention. The second embodiment is different from the first embodiment in that the secondary throttle valve is not present therein. Instead, the throttle valve 25 is connected one side of the accelerating pedal, the throttle motor 4 is connected to the other side; and the degree of opening angle is detected by an opening angle sensor 9.

The traction control apparatus in accordance with the second embodiment is provided with a control factor calculation section 81, a running condition and road surface decision section 82, an engine torque calculating section 86, an acceleration performance enhancing section 83, a driving safety securing section 84, a throttle motor controlling section 85.

In the traction control apparatus of the second embodiment, the rotating speeds of the wheels are inputted to the control factor calculation section 81, which calculates and outputs the current slip values of the driving wheels $S_C$, the differential values of the wheel slips, the value of the vehicle speed V, the value of longitudinal acceleration $aX_C$, the longitudinal jerk of the vehicle, the current value of centripetal acceleration $aY_C$, the value of centripetal jerk of the vehicle, an instant engine torque $T_C$ which reflects the kinetic effect of the rotating body and a degree of unsafety $U_C$ about driven axle.

The running condition and road surface decision section 82 then decides the running conditions based on the outputs from the control factor calculation section 81 and generates outputs reflecting the road conditions.

The acceleration performance enhancing section 83 controls the engine torque to prevent the wheels from slipping by using the outputs from the control factor calculation section 81, the running condition and road surface decision section 82, and the engine torque calculating section 86. The driving safety securing section 84 secures the running safety by controlling the centrifugal force of the vehicle, and the throttle motor controlling section 85 controls the opening angle of the throttle valve 25 through the throttle motor by comparing the outputs from the acceleration performance enhancing section 83 and the outputs from the driving safety securing section 84.

Figure 9:
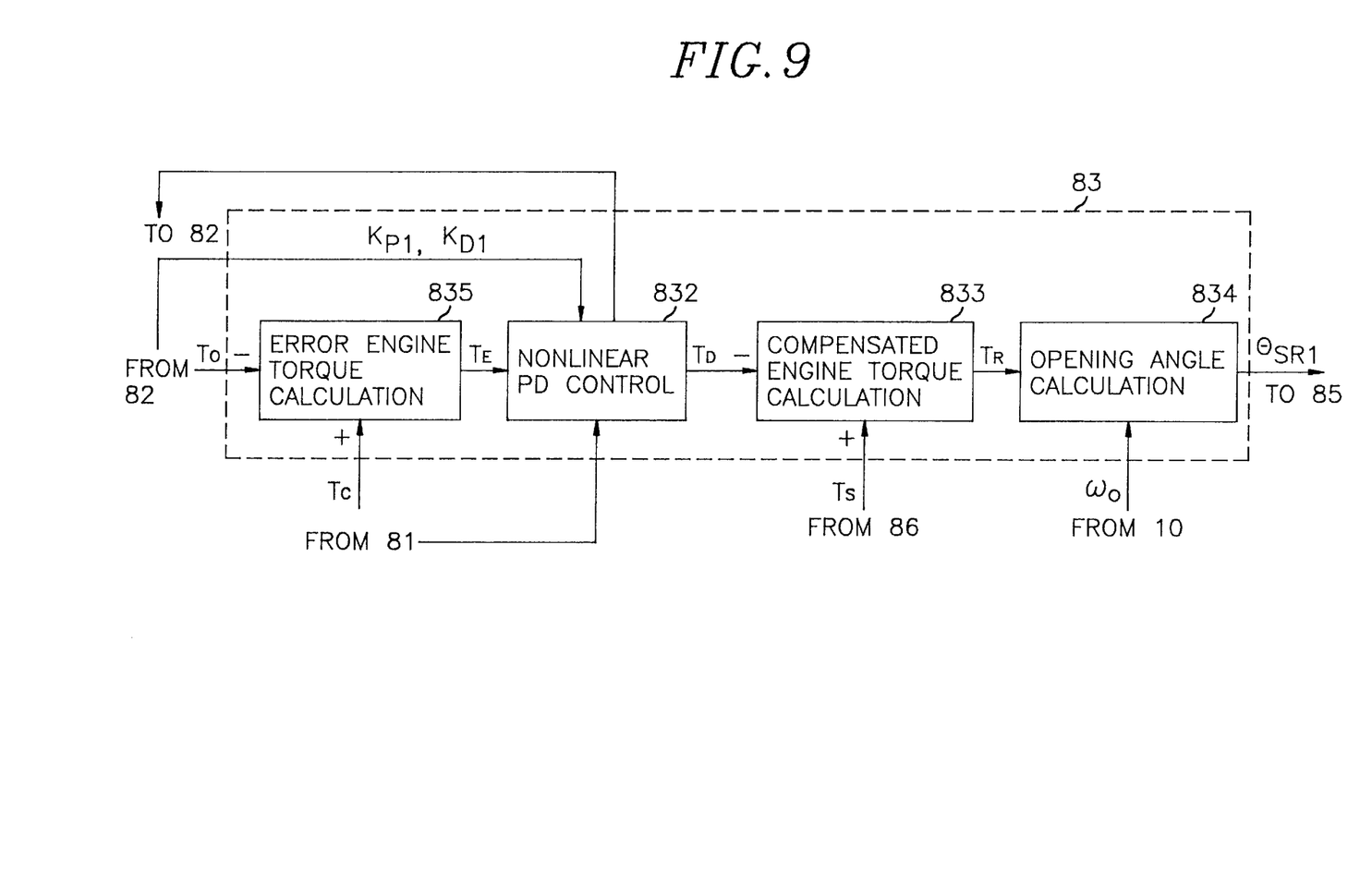
FIG. 9 explains a schematic block diagram of a performance controlling section in the second embodiment.

FIG. 9 is the schematic block diagram of the acceleration performance enhancing section 83 in the second embodiment. The acceleration performance enhancing section 83 is provided with an error engine torque calculating section 835, a nonlinear PD controlling section 832, a compensated engine torque calculating section 833 and a desired value of the opening angle calculating section 834.

Figure 10:
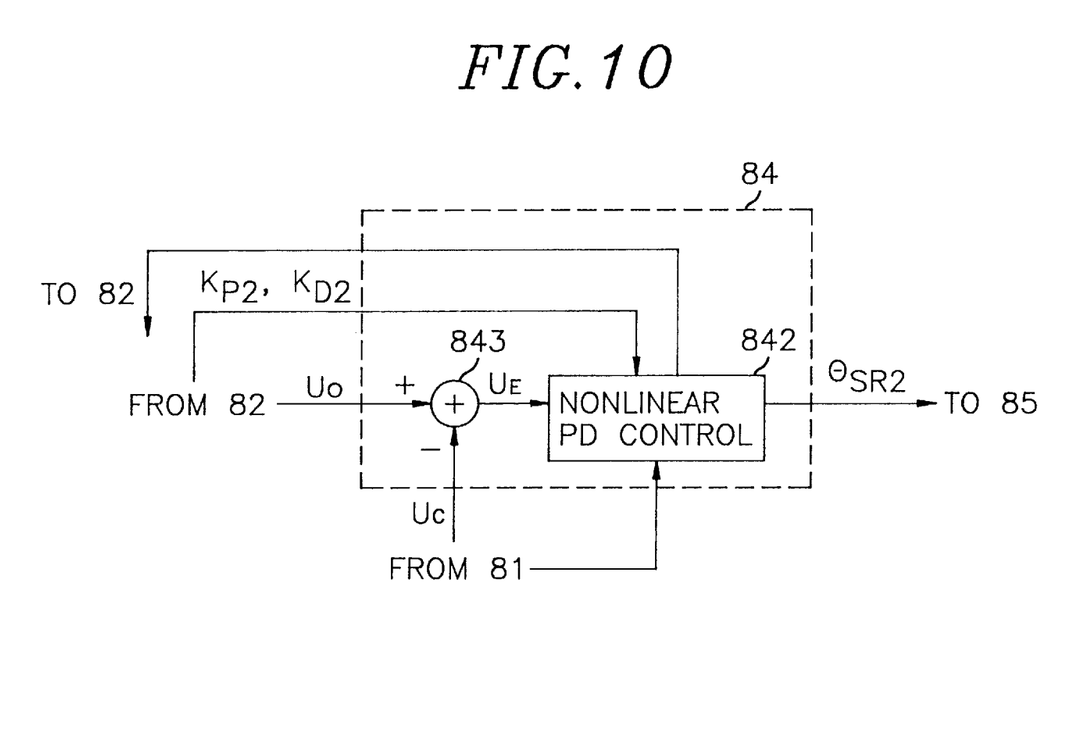
FIG. 10 describes a circuit diagram of a driving safety securing section in the second embodiment.

FIG. 10 is a schematic block diagram of the driving safety securing section 84 including a subtractor 843 and a nonlinear PD controlling section 842.

Figure 11:
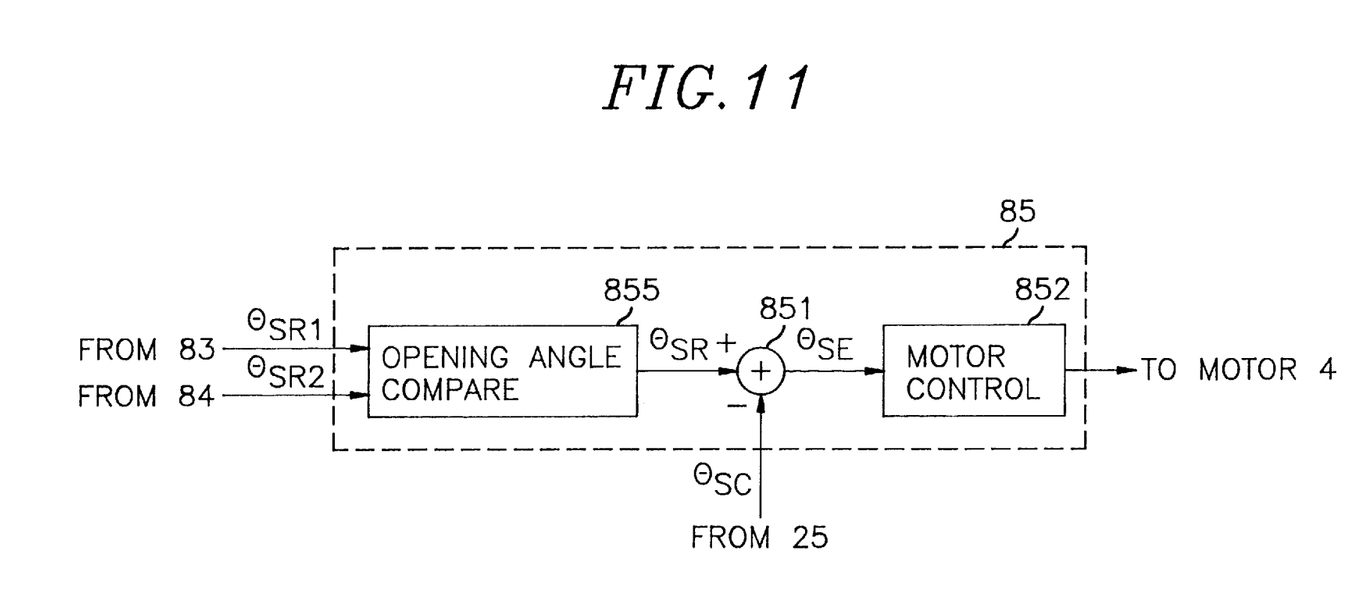
FIG. 11 sets forth a circuit diagram showing how a throttle motor in the second embodiment is controlled.

FIG. 11 is a schematic block diagram showing how the throttle motor section 85 of the second embodiment is controlled, the throttle motor controlling section comprising an opening angle comparing section 855, a subtractor 851 and a PID motor controlling section 852.

In the second embodiment of the present invention, the outputs from the wheel speed sensors 11–14 are inputted to the control factor calculation section 81 which calculates and generates the slips of wheels, the differential values of the wheel slips, the value of the vehicle speed, the value of longitudinal acceleration of the vehicle, the longitudinal jerk of the vehicle, the current value of centripetal acceleration of the vehicle, the value of centripetal jerk of the vehicle, the instant engine torque $T_C$ which reflects the kinetic effect of the rotating body, and the running unsafe degree $U_C$ about driven axle.

The running condition and road surface decision section 82 calculates and outputs the desired value of the engine torque $T_O$, the proportional gain coefficient $K_{P1}$ and the differential gain coefficient $K_{D1}$ using the outputs from the control factor calculation section 81 and from the nonlinear PD controlling section 832; and outputs $T_O$ to the error engine torque calculating section 835 and $K_{P1}$ and $K_{D1}$ to the nonlinear PD controlling section 832.

Figure 12:
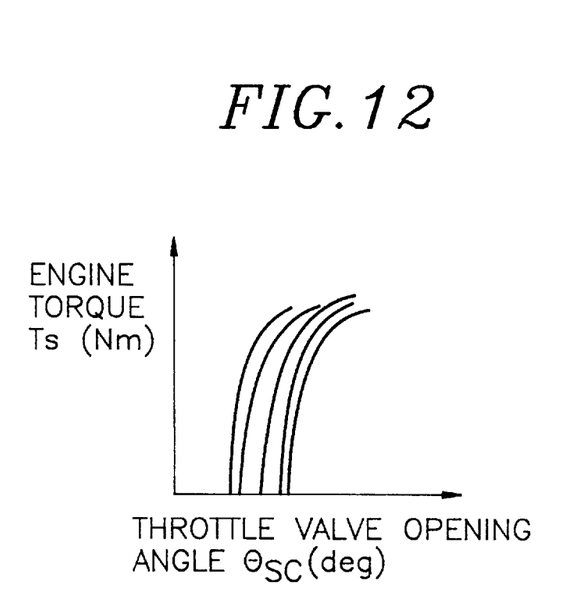
FIG. 12 illustrates relationship between the throttle valve opening angle and the engine torque in accordance with the second embodiment.

The engine torque calculating section 86 calculates the steady-state engine torque $T_S$ which does not reflect the kinetic effect of the rotating body by using the rotating speed $\omega_O$ of the engine and the current opening angle of the throttle valve $\theta_{SC}$, by using FIG. 12 which shows the relationship between the opening angle $\theta_{SC}$ of the throttle valve and the engine torque $T_S$, and outputs the steady-state engine torque $T_S$ to a compensated engine torque calculating section 833. It should be noted that each of the relationship, i.e., line, in FIG. 12 is for a particular $\omega_O$.

The acceleration performance enhancing section 83 calculates the error value of the engine torque $T_E$ by subtracting the desired engine torque $T_O$ from the instant engine torque $T_C$ which reflects the kinetic effects of the rotating body and which is the output from the control factor calculation section 81 in the error engine torque calculating section 835.

The error value of the engine torque $T_E$ depends on the angular speed of the driving axle, the angular acceleration, the angular speed of driven axle, angular acceleration of driven axle, the desired driving wheel slip values and moment of inertia of the rotating body. The nonlinear PD controlling section 832 compensates the calculated error value of the engine torque $T_E$ by using the PD controlling method based on the proportional gain coefficient $K_{P1}$ and the differential gain coefficient $K_{D1}$ outputted from the running condition and road surface decision section 82; calculates the error engine torque compensating value $T_D$ within the maximum and minimum set obtained using the outputs from the control factor calculation section; and generates outputs to be used in calculating the desired value of the engine torque $T_O$, the proportional gain coefficient $K_{P1}$ and the differential gain coefficient $K_{D1}$ at the running condition and road surface decision section 82.

The calculated error engine torque compensating value $T_D$ is inputted to the compensated engine torque calculating section 833; and the engine torque compensating value $T_D$ is subtracted from the steady-state engine torque $T_S$ outputted from the engine torque calculating section 86 to generate a compensated engine torque $T_R$ which is then outputted to the desired opening angle calculating section 834.

At the desired value of the opening angle calculating section 834, the desired opening angle $\theta_{SR1}$ is calculated by using FIG. 12 with the rotating speed $\omega_O$ of engine and the compensated engine torque $T_R$.

On the other hand, the running condition and road surface decision section 82 calculates and outputs a degree of unsafety allowable $U_O$, the proportional gain coefficient $K_{P2}$ and the differential gain coefficient $K_{D2}$. The degree of unsafety about driven axle $U_C$ is calculated using the formula:

$$U_C = (C_X^* aX_C^2 + C_Y^* aY_C^2)^{1/2}, \qquad (V)$$

wherein $C_X$ and $C_Y$ are constants, $aX_C$ is the vehicle body longitudinal acceleration and $aY_C$ is the vehicle body centripetal acceleration.

The driving safety securing section 84 then calculates an error in the degree of unsafety $U_E$ by subtracting in a subtractor 843 the degree of unsafety about driven axle UC which is the output from the control factor calculation section 81 from the degree of unsafety allowable $U_O$ which is outputted from the running condition and road surface decision section 82.

The nonlinear PD controlling section 842 compensates the error in the degree of unsafety $U_E$ using the PD controlling method based on the proportional gain coefficient $K_{P2}$ and the differential gain coefficient $K_{D2}$ outputted from the running condition and road surface decision section 82; calculates the desired opening angle $\theta_{SR2}$ within the maximum and minimum set obtained using the outputs from the control factor calculation section; and generates outputs to be used in calculating the degree of unsafety allowable $U_O$, the proportional gain coefficient $K_{P2}$ and the differential gain coefficient $K_{D2}$ to the running condition and road surface decision section 82.

The calculated desired opening angle $\theta_{SR1}$ outputted from the desired value of the opening angle calculating section 834 of the acceleration performance enhancing section 83 and the desired opening angle $\theta^{SR2}$ outputted from the nonlinear PD controlling section 842 of driving safety securing section 84 are inputted to the opening angle comparing section 855 of the throttle motor controlling section 85. The opening angle comparing section 855 picks the smaller angle of these two angles as the desired opening angle $\theta_{SR}$ and inputs it to the subtractor 851. The subtractor 851 calculates the error in throttle valve opening angle $\theta_{SE}$ by subtracting the current value of the opening angle $\theta_{SC}$ from the desired opening angle $\theta_{SR}$.

According to the error in opening angle $\theta_{SE}$ calculated using in the method described, the PID motor controlling section 852 controls the throttle motor 4.

As mentioned above, also in the second embodiment of the present invention, there is no need to convert the centripetal acceleration value to the wheel slip value because the electronic controller calculates and controls the running safety and the accelerating performance separately. Furthermore, the electronic controller, as well as improving the running safety of the vehicle by restraining the excessive increase of the centrifugal force, improves the accelerating performance of the vehicle by taking into consideration the running condition and the road conditions by incorporating therein the nonlinear PD controlling section which determines the proportional gain coefficient and the differential gain coefficient, reflecting, the running conditions of the vehicle and the road conditions. Although the invention has been shown and described with respect to the preferred embodiments, it will be understood by those skilled in the art that various changes and modifications may be made without departing from the spirit and the scope of the invention as defined in the following claims.

What is claimed is:

1. A traction control apparatus for use with a vehicle, said apparatus comprising:

a control factor calculation section for determining current slip values of driving wheels, differential values of the wheel slips, a value of a vehicle speed, a value of longitudinal acceleration of the vehicle, a value of longitudinal jerk of the vehicle, a current value of centripetal acceleration of the vehicle and a value of centripetal jerk of the vehicle by using wheel speed values detected by driving wheel speed sensors and driven wheel speed sensors;

a running condition and road surface decision section for determining a desired wheel slip value, a proportional gain coefficient for controlling the wheel slip, a differential gain coefficient for controlling the wheel slip, a desired value of cent ripetal acceleration, a proportional gain coefficient for controlling the centripetal acceleration and a differential gain coefficient for controlling the centripetal acceleration by using the values determined by said control factor calculation section;

an acceleration performance enhancing section for determining a first desired opening angle of a secondary throttle valve by using the desired wheel slip value, the proportional gain coefficient for controlling the wheel slip and the differential gain coefficient for controlling the wheel slip and the values determined by the control factor calculation section;

a driving safety securing section for determining a second desired opening angle of the secondary throttle valve by using the desired value of centripetal acceleration, the proportional gain coefficient for controlling the centripetal acceleration and the differential gain coefficient for controlling the centripetal acceleration and the values determined by the control factor calculation section; and a secondary throttle motor controlling section for operating a secondary throttle motor connected to the secondary throttle valve depending upon the smaller one of the first and the second desired opening angles of the secondary throttle valve.

2. The traction control apparatus of claim 1, wherein the acceleration performance enhancing section includes a subtractor for calculating an error wheel slip value by subtracting the current wheel slip value from the desired wheel slip value and a nonlinear PD controlling section for compensating the error wheel slip value by using the proportional gain coefficient for controlling the wheel slip, and the differential gain coefficient for controlling the wheel slip and the values determined by said control factor calculation section to calculate the first desired opening angle of the throttle valve, and the driving safety securing section includes a subtractor for calculating an error value of centripetal acceleration by subtracting the current value of centripetal acceleration from the desired value of the centripetal acceleration and a nonlinear PD controlling section for compensating the error value of centripetal acceleration by using the proportional gain coefficient for controlling the centripetal acceleration, the differential gain coefficient for controlling the centripetal acceleration and the values determined by said control factor calculation section to calculate the second desired opening angle of the throttle valve.

3. The traction control apparatus of claim 2, wherein the secondary throttle motor controlling section is provided with an opening angle comparing section for determining the smaller one by comparing the first desired opening angle and the second desired opening angle, a subtractor for calculating an error value of the opening angle of the secondary throttle valve by subtracting a current value of the opening angle from the smaller opening angle determined by the opening angle comparing section and a PID motor controlling section for controlling the opening angle of the secondary throttle valve by using the error value of the opening angle of the secondary throttle valve.

4. A traction control apparatus for use with a vehicle, said apparatus comprising:

a control factor calculation section for determining current slip values of driving wheels, differential values of the wheel slips, a value of a vehicle speed, a value of longitudinal acceleration of the vehicle, a value of longitudinal jerk of the vehicle, a current value of centripetal acceleration of the vehicle and a value of centripetal jerk of the vehicle, an instant engine torque and an unsafe degree of the vehicle by using wheel speed values detected by driving wheel speed sensors and driven wheel speed sensors;

a running condition and road surface decision section for determining a desired unsafe degree of the vehicle, a proportional gain coefficient for controlling the unsafe degree, a differential gain coefficient for controlling the unsafe degree, a desired value of engine torque, a proportional gain coefficient for controlling the engine torque and a differential gain coefficient for controlling the engine torque by using the values determined by said control factor calculation section;

an engine torque calculating section for determining a steady-state engine torque by using a current engine rotating speed and a current opening angle of a throttle valve;

an acceleration performance enhancing section for determining a first desired opening angle of the throttle valve by using the desired value of the engine torque, the proportional gain coefficient for controlling the engine torque and the differential gain coefficient for controlling the engine torque, the values determined by the control factor calculation section and the steady-state engine torque calculated from the engine torque calculating section;

a driving safety securing section for determining a second desired opening angle of the throttle valve by using the desired unsafe degree of the vehicle, the proportional gain coefficient for controlling the unsafe degree and the differential gain coefficient for controlling the unsafe degree and the values determined by the control factor calculation section; and a throttle motor controlling section for operating a throttle motor connected to the throttle valve depending upon the smaller one of the first and the second desilred opening angle of the throttle valve.

5. The traction control apparatus of claim 4, wherein the acceleration performance enhancing section is provided with an error engine torque calculating section for calculating an error value of the engine torque by subtracting the desired value of the engine torque from the instant engine torque, a nonlinear PD controlling section for compensating the error value of the engine torque to a second error value of the engine torque by using the proportional gain coefficient for controlling the engine torque and the differential gain coefficient for controlling the engine torque and the values determined by said control factor calculation section, a compensated engine torque calculating section for calculating a compensated value of the engine torque by subtracting the second error value of the engine torque from the steady-state engine torque, a desired throttle valve opening angle calculating section for calculating the first desired opening angle by using the current engine rotating speed and the compensated value of the engine torque, and wherein the driving safety securing section is provided with a subtractor for calculating an error unsafe degree of the vehicle by subtracting a current unsafe degree from the desired unsafe degree of the vehicle, a PD controlling section for compensating the error unsafe degree by using the proportional gain coefficient for controlling the unsafe degree, the differential gain coefficient for controlling the unsafe degree and the values determined by said control factor calculation section to thereby output a second desired opening angle of the throttle valve.

6. The traction control apparatus of claim 5, wherein the throttle motor controlling section is provided with an opening angle comparing section for determining the smaller one by comparing the first desired opening angle and the second desired opening angle, a subtractor for calculating an error value of the opening angle of the throttle valve by subtracting the current throttle valve opening angle from the smaller opening angle determined by the opening angle comparing section and a PID motor controlling section for controlling the opening angle of the throttle valve by using the error value of the opening angle of the throttle valve.

* * * * *

UNITED STATES PATENT AND TRADEMARK OFFICE
CERTIFICATE OF CORRECTION

PATENT NO. : 5,867,803
DATED : February 2, 1999
INVENTOR(S) : Keon Kim, et al

It is certified that error appears in the above-identified patent and that said Letters Patent is hereby corrected as shown below:

On the title page, item [30],

```
        Foreign Application Priority Data

May 28, 1996   [KR]   Rep. of Korea      96-18262
   Aug. 29, 1996  [KR]   Rep. of Korea      96-36375
```

Signed and Sealed this

Eighteenth Day of May, 1999

Attest:

Attesting Officer

Q. TODD DICKINSON

Acting Commissioner of Patents and Trademarks